United States Patent
Tanabe

(10) Patent No.: US 7,789,549 B2
(45) Date of Patent: Sep. 7, 2010

(54) LIGHT GUIDE PLATE, SURFACE LIGHT SOURCE, AND LIQUID CRYSTAL DISPLAY DEVICE

(75) Inventor: Takayoshi Tanabe, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 164 days.

(21) Appl. No.: 11/910,898

(22) PCT Filed: May 25, 2006

(86) PCT No.: PCT/JP2006/310486

§ 371 (c)(1),
(2), (4) Date: Oct. 5, 2007

(87) PCT Pub. No.: WO2006/134763

PCT Pub. Date: Dec. 21, 2006

(65) Prior Publication Data

US 2009/0080216 A1    Mar. 26, 2009

(30) Foreign Application Priority Data

Jun. 13, 2005  (JP) .............................. 2005-172878

(51) Int. Cl.
*F21V 7/04* (2006.01)
(52) U.S. Cl. .................. 362/621; 362/612; 362/613
(58) Field of Classification Search .................. 362/600, 362/602, 608, 610, 612, 613, 621, 628; 349/65
See application file for complete search history.

(56) References Cited

U.S. PATENT DOCUMENTS

| 6,893,136 | B2 * | 5/2005 | Yang ........................... 362/628 |
| 7,237,940 | B2 * | 7/2007 | Yu et al. ...................... 362/621 |
| 2002/0175632 | A1 | 11/2002 | Takeguchi |
| 2004/0145914 | A1 * | 7/2004 | Yu et al. ...................... 362/621 |
| 2006/0232998 | A1 * | 10/2006 | Tsai et al. .................... 362/621 |

FOREIGN PATENT DOCUMENTS

| JP | 2002-169034 A | 6/2002 |
| JP | 2003-109421 A | 4/2003 |
| JP | 2003-123525 A | 4/2003 |
| JP | 2004-079488 A | 3/2004 |
| JP | 2004-171966 A | 6/2004 |

OTHER PUBLICATIONS

Official communication issued in the International Application No. PCT/JP2006/310486, mailed on Aug. 15, 2006.

* cited by examiner

*Primary Examiner*—Y My Quach Lee
(74) *Attorney, Agent, or Firm*—Keating & Bennett, LLP

(57) ABSTRACT

A light guide plate has a light exit plane and a light entrance plane arranged on the periphery of the light exit plane. Light incident on the light entrance plane is outputted from the light exit plane. The light entrance plane includes a plurality of first end surfaces and a plurality of second end surfaces protruding in an external direction beyond the first end surfaces in plan view. The first end surfaces and the second end surfaces are alternately arranged along the periphery of the light exit plane.

3 Claims, 5 Drawing Sheets

LIGHT GUIDE PLATE, SURFACE LIGHT SOURCE, AND LIQUID CRYSTAL DISPLAY DEVICE

BACKGROUND OF THE INVENTION

1. Field of the Invention

The present invention relates to a light guide plate for a light source of sidelight type, a surface light source including the light guide plate, and a liquid crystal display device including the surface light source.

2. Description of the Related Art

FIGS. 9A and 9B are plan views schematically illustrating a conventional light source of sidelight type. As shown in FIG. 9A, a light guide plate 108 has an end surface provided with a plurality of LEDs (Light Emitting Diodes) 106. An example of a method of reducing unevenness in luminance of the surface light source with an aim to improve the luminance includes a method of mounting the LEDs 106 with high density. Specifically, a mounting interval between the LEDs 106 adjacent to each other is reduced from a mounting interval B of FIG. 9A to a mounting interval C of FIG. 9B, which increases the mounted number of LEDs 106. The mounting interval can be defined as a distance between adjacent light sources in the periphery direction of the light guide plate.

However, shortening the mounting interval C is subjected to restrictions specific to the shape of the LEDs 106 or a device on which the LEDs are to be mounted. Moreover, if the mounting interval C is short, heat generated by the LEDs 106 adjacent to each other reduces light emitting efficiency. Generally, to prevent the thermal destruction of the LEDs 106 caused by a temperature rise, the maximum current for driving the LEDs 106 to emit light is restricted. If the LEDs 106 adjacent to each other suffer from reciprocal interference of heat generated by themselves, a stricter restriction is put on the maximum current. As a result, only a reduced current can be applied to the LEDs 106. Therefore, it is difficult to allow the LEDs 106 to brightly emit light.

Japanese Laid-Open Patent Publication No. 2004-79488 (especially see FIG. 4) discloses that LED elements are arranged on light entrance planes formed on two facing edges, wherein the LED elements are arranged such that optical axes do not overlap with each other.

Moreover, Japanese Laid-Open Patent Publication No. 2003-109421 (especially see FIG. 1) discloses that a plurality of light entrance planes are provided with a plurality of light sources arranged such that light incident angles are different from each other.

In Japanese Laid-Open Patent Publication No. 2004-79488, the LED elements are arranged on the two facing edges, which causes a problem that a frame region of a liquid crystal display device increases. Moreover, in Japanese Laid-Open Patent Publication No. 2003-109421, the light sources are arranged on a backside of a light guide plate, which causes a problem that the thickness of a backlight unit increases.

SUMMARY OF THE INVENTION

In order to overcome the problems described above, preferred embodiments of the present invention densely mount light sources so as to reduce unevenness in luminance and so as to increase the luminance. In addition, preferred embodiments of the present invention reduce interference between the light sources due to heat generation. Furthermore, preferred embodiments of the present invention reduce the thickness or the size of a surface light source.

A preferred embodiment of the present invention provides a light guide plate allowing light incident on a light entrance plane to exit a light exit plane. The light entrance plane has a plurality of end surfaces including at least one first end surface and at least one second end surface protruding in an external direction beyond the first end surface in plan view. The first end surface and the second end surface are alternately arranged along the periphery of the light exit plane.

Another preferred embodiment of the present invention provides a surface light source including the light guide plate according to the above-described preferred embodiment of the present invention and a plurality of light sources for emitting light onto the plurality of end surfaces. The plurality of light sources are arranged out of alignment with a straight line along the periphery of the light exit plane.

The light guide plate can serve as a surface light source wherein light incident on the light entrance plane is optically transmitted inside the light guide plate and output from the light exit plane. A light transmission function inside the light guide plate is not specifically limited. The light guide plate is preferably formed of a transparent resin material such as polycarbonate or polymethyl methacrylate, for example. The light guide plate preferably has a plate shape or a wedge shape, for example.

The light guide plate may have a reflection member on a counter plane opposite the light exit plane. The reflection member may be provided by affixing a silver sheet or a white resin sheet having a high reflection rate or may be formed by applying a white pigment on the counter plane of the light guide plate. Alternatively, a reflection sheet having a high reflection rate may be provided on the counter plane of the light guide plate. Alternatively, it is also possible to adopt, for example, a prism cut process or a dot process for providing a plurality of concavities and convexities on the counter plane of the light guide plate, or a rough surface process for forming fine concavities and convexities by grinding the counter plane of the guide plate.

Preferably, each of the light sources emits light from a surface facing the light entrance plane of the light guide plate, but does not emit light from a surface opposite the light entrance plane, i.e., each of the light sources preferably has directivity. Each of the light sources may have a line shape or a dot shape. A typical example of the light sources includes an LED. For example, it is possible to use an LED of at least one color selected from the group consisting of a white LED, a red LED, a green LED, and a blue LED. Most of white LEDs adopt a fluorescent substance to convert part of blue light of the blue LED to yellow light and mix these two colors to produce quasi-white light. The light sources are typically mounted on a substrate such as a FPC (Flexible Printed Circuit) or PCB (Printed Circuit Board).

The surface light source according to a preferred embodiment of the present invention can be used as a plane lighting device used for a color check or a visual inspection for cuts of various products or used for judgment of jewels or as a surface light source for a liquid crystal display device or an illuminated billboard. The illuminated billboard includes a translucent, plate-shaped display section and a surface light source provided on a backside of the display section. The display section is a translucent resin substrate or a glass substrate printed with letters or patterns.

A liquid crystal display device preferably includes a surface light source and a liquid crystal display panel arranged on a light exit plane side of the surface light source. The surface light source according to a preferred embodiment of the present invention may be used as a backlight provided on a backside of the liquid crystal display panel or a front light provided on an observer side of the liquid crystal display panel. The backlight is used in combination with a transmission-type liquid crystal display panel or a transmission- and reflection-type liquid crystal display panel. The front light is used in combination with a reflection-type liquid crystal display panel. A surface light source used as a front light typically has a light guide plate whose counter plane is formed with a prism. The transmission- and reflection-type liquid crystal display panel has pixels, each of which has a transparent region and a reflection region.

A liquid crystal display device according to various preferred embodiments of the present invention is applicable, for example, to a monitor such as a television set, a mobile information terminal such as a PDA (Personal Digital Assistant), a mobile telephone, a digital camera, or an amusement device.

According to the light guide plate according to a preferred embodiment of the present invention, it is possible to densely mount light sources while reducing interference between the light sources adjacent to each other due to heat generation. Moreover, according to the surface light source including the light guide plate according to a preferred embodiment of the present invention, a reduction in thickness and in size is possible.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
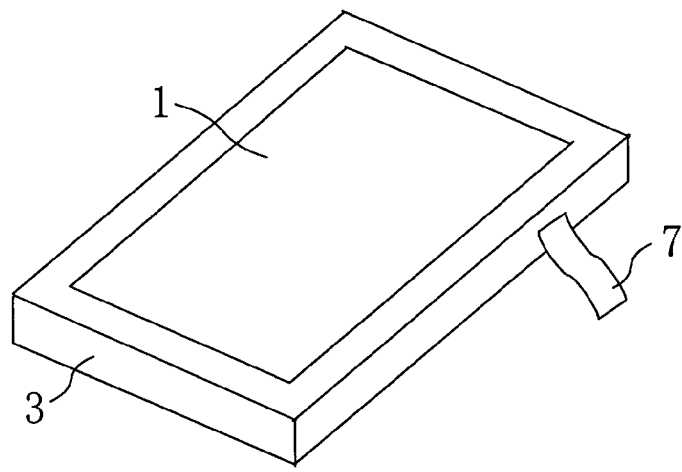
FIG. 1 is a perspective view schematically illustrating a liquid crystal display device according to a first preferred embodiment of the present invention.

Referring to the drawings, preferred embodiments of the present invention will be described. In the following preferred embodiments, descriptions are given of a transmission-type liquid crystal display device including a backlight of sidelight type. In order to collectively indicate similar components, only numerals of reference symbols may be denoted, with alphabets of the reference symbols being omitted. For example, a first LED 6a and a second LED 6b may be collectively represented by LED 6.

Figure 2:
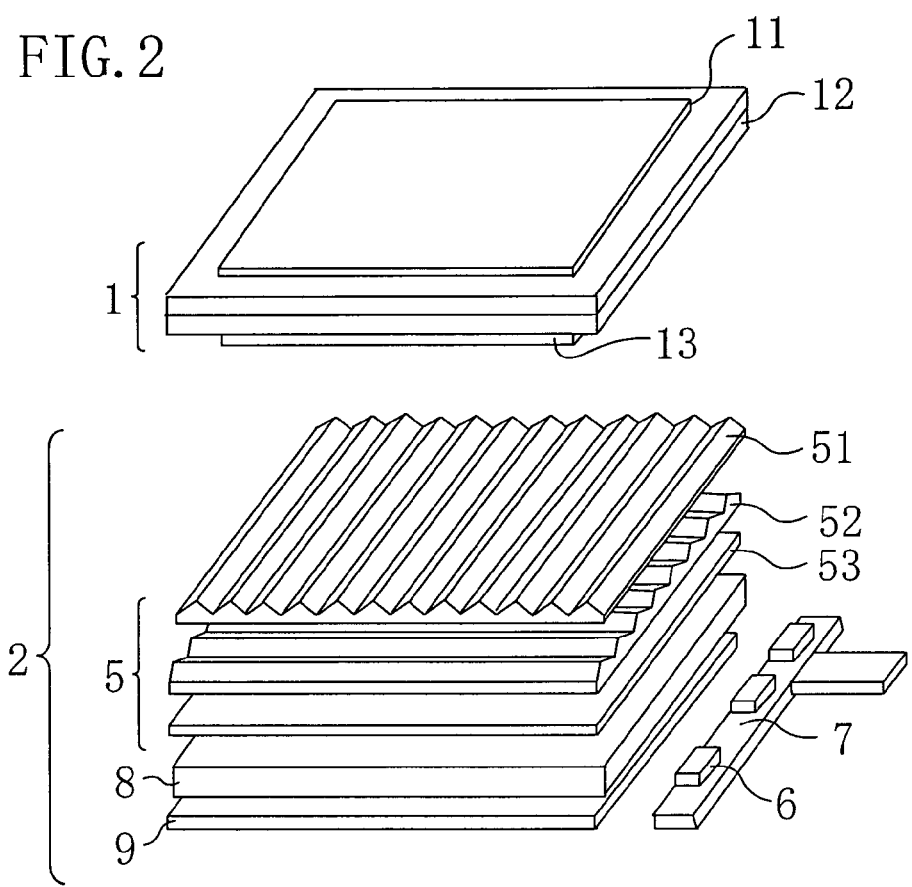
FIG. 2 is an exploded perspective view of the liquid crystal display device according to the first preferred embodiment of the present invention.
Figure 3:
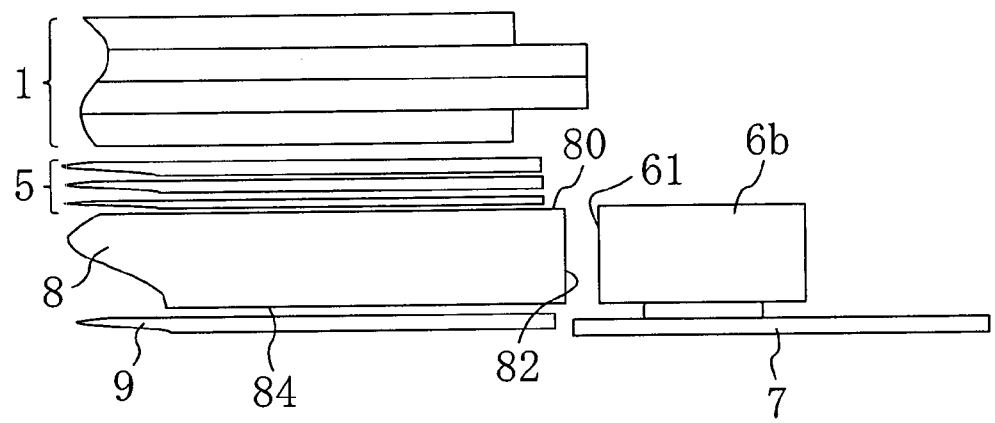
FIG. 3 is a partial cross sectional view of the liquid crystal display device according to the first preferred embodiment of the present invention.

FIG. 1 is a perspective view schematically illustrating a liquid crystal display device of the present preferred embodiment. FIG. 2 is an exploded perspective view and FIG. 3 is a partial cross sectional view of FIG. 1. The liquid crystal display device of the present preferred embodiment includes a liquid crystal display panel 1, a surface light source 2 provided on a backside of the liquid crystal display panel 1, and a frame 3 accommodating the liquid crystal display panel 1 and the surface light source 2. The frame 3 further accommodates a flexible substrate 7 on which LEDs 6 are mounted.

The liquid crystal display panel 1 includes a liquid crystal panel 12 encapsulating a liquid crystal material, an upper deflection plate 11 provided on an upper surface (observer side) of the liquid crystal panel 12, and a lower deflection plate 13 provided on a lower surface (a side facing the surface light source 2) of the liquid crystal panel 12. The liquid crystal panel 12 includes, for example, a TFT (Thin Film Transistor) array substrate, a color filter substrate, and a liquid crystal layer provided therebetween.

The surface light source 2 includes a light guide plate 8, a light control element 5, a reflection sheet 9, and the LEDs 6. The light control element 5 is provided on a side of the light guide plate 8 facing the liquid crystal display panel 1. The reflection sheet 9 is provided on a backside of the light guide plate 8. The LEDs 6 are provided on an end surface of the light guide plate 8. The light control element 5 includes an upper refract ion prism sheet 51, a lower refraction prism sheet 52, and a diffusion sheet 53.

Figure 4:
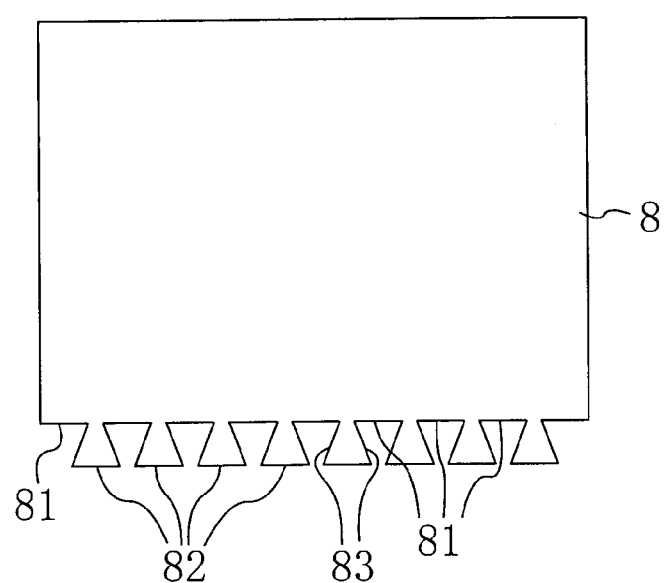
FIG. 4 is a plan view schematically illustrating a light guide plate according to the first preferred embodiment of the present invention.

FIG. 4 is a plan view schematically illustrating the light guide plate 8. The light guide plate 8 has a light exit plane 80, a counter plane 84 (see FIG. 3) opposite the light exit plane 80, and four end surfaces on the periphery of the light exit plane 80 and the counter plane 84. In the present preferred embodiment, one of the four end surfaces forms a light entrance plane. The light entrance plane includes a plurality of end surfaces. The plurality of end surfaces include a plurality of first end surfaces 81 and a plurality of second end surfaces 82. The second end surfaces 82 protrude in an external direction beyond the first end surfaces 81 in plan view. The first end surfaces 81 are connected with the second end surfaces 82 by inclined surfaces 83, each of which has an acute angle relative to the first and second end surfaces 81 and 82. In other words, the end surface of the light guide plate 8 is formed with dovetail grooves. The first end surfaces 81 and the second end surfaces 82 are alternately arranged along the periphery of the light exit plane 80. It is preferable that the first end surfaces 81 and the second end surfaces 82 are substantially parallel to each other, and the distance between each first end surface 81 and each second end surface 82 is about the size of depth of an LED 6 or greater.

Figure 5:
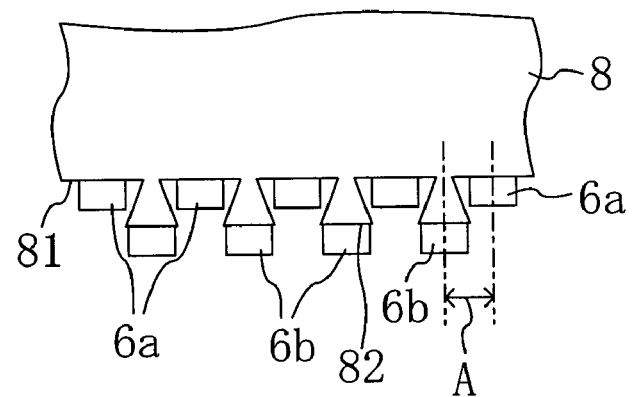
FIG. 5 is a plan view partially illustrating an end surface of the light guide plate of the first preferred embodiment of the present invention.

FIG. 5 is a plan view partially illustrating the end surface of the light guide plate 8 of the present preferred embodiment, with the arrangement of the LEDs 6 being shown. Each first end surface 81 is provided with a first LED 6a which emits light. Each second end surface 82 is provided with a second LED 6b. The LEDs 6 are provided on the first end surfaces 81 and the second end surfaces 82, resulting in a zigzag arrangement of LEDs 6 in plan view. In other words, the end surface of the light guide plate 8 is provided with two lines of LEDs 6. Specifically, a line of first LEDs 6a and a line of second LEDs 6b are arranged on the periphery of the light exit plane 80, the line of the second LEDs 6b protruding beyond the line of the first LEDs 6a in plan view. The optical axis of the first LED 6*a* and the optical axis of the second LED 6*b* are substantially parallel to each other.

Figure 9A:
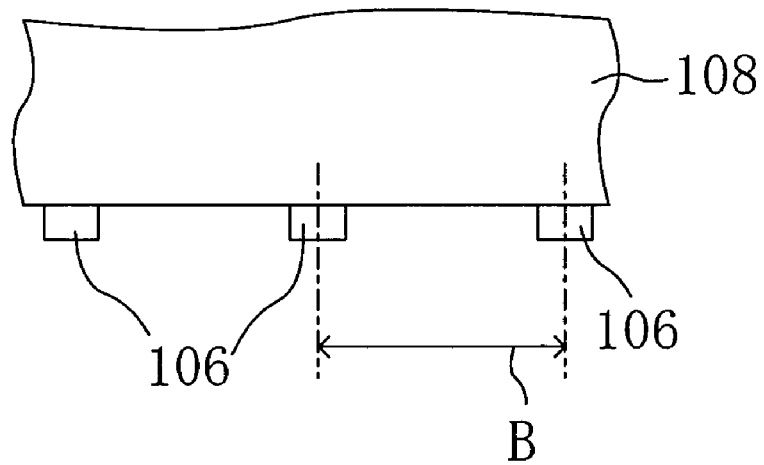
FIGS. 9A and 9B are plan views schematically illustrating a conventional light source of sidelight type.
Figure 9B:
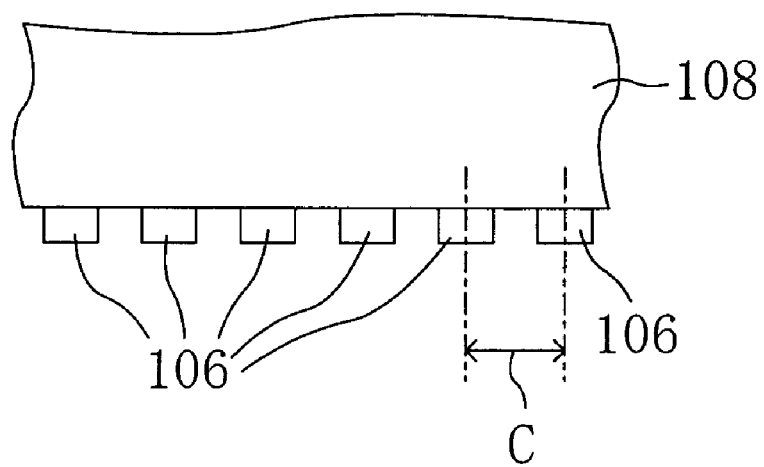

As described above, the plurality of LEDs 6 are arranged out of alignment with a straight line on the periphery of the light exit plane 80. Therefore, it is possible to make the mounting interval between the LEDs 6 being in different lines and being adjacent to each other, i.e. a mounting interval A between a first LED 6*a* and a second LED 6*b*, smaller than the mounting interval C of FIG. 9B. As a result, it is possible to densely mount the LEDs 6, which reduces the unevenness in luminance and improves the luminance of the surface light source. Moreover, the distance between the first LED 6*a* and the second LED 6*b* is greater than the mounting interval A, so that it is possible to reduce the interference between LEDs 6 due to heat generation.

Meanwhile, it is possible to ensure a sufficient mounting interval (two times as wide as the mounting interval A) between the LEDs 6 being in the same line and being adjacent to each other, i.e., between a first LED 6*a* and a first LED 6*a*, and between second LED 6*b* and a second LED 6*b*. Therefore, mounting of LEDs 6 is possible without being subjected to restrictions specific to the shape of the LEDs 6 or the device on which the LEDs 6 are to be mounted.

If necessary, the LEDs 6 mounted on the flexible substrate 7 may discharge heat to a metal frame via a heat conduction body or by directly touching the metal frame. For example, a method disclosed in Japanese Laid-Open Patent Publication No. 2004-186004 may be adopted.

In the surface light source of the present preferred embodiment, the LEDs 6 are arranged on one of the four end surfaces of the light guide plate 8. Therefore, it is possible to reduce the frame region of the liquid crystal display device compared to the backlight unit of Japanese Laid-Open Patent Publication No. 2004-79488, which has LED elements arranged on both end surfaces facing each other. Accordingly, the size can be reduced even more in the present preferred embodiment than in the backlight unit of Japanese Laid-Open Patent Publication No. 2004-79488. Moreover, it is not necessary for the surface light source of the present preferred embodiment to provide the LEDs 6 on the backside of the light guide plate, which allows a reduction in thickness.

In the present preferred embodiment, the plurality of first end surfaces 81 and the plurality of second end surfaces 82 are preferably provided. However, the number of at least one of the first end surface 81 and the second end surface 82 may be one. For example, one dovetail groove may be formed in the end surface of the light guide plate to form a light entrance plane having one first end surface 81 and two second end surfaces 82. Alternatively, one protrusion may be formed in the end surface of the light guide plate to form a light entrance plane having two first end surfaces 81 and one second end surface 82.

Figure 6:
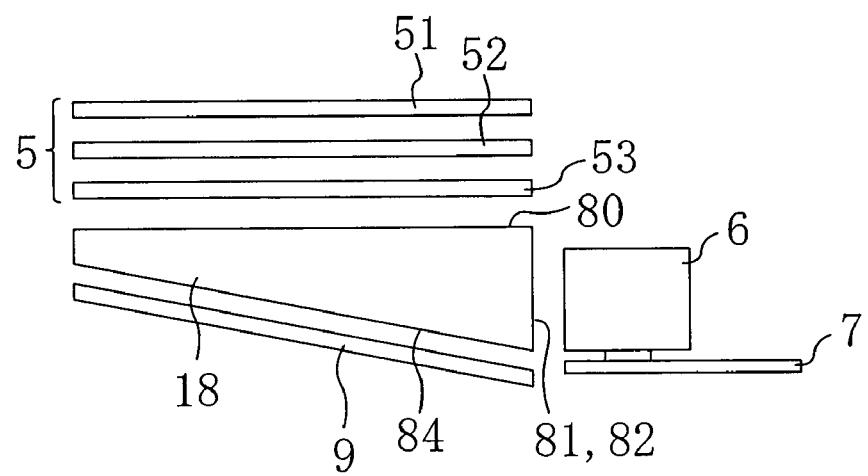
FIG. 6 is a cross sectional view schematically illustrating a surface light source according to a second preferred embodiment of the present invention.

The light guide plate 8 of FIG. 3 has a parallel plate shape where the light exit plane 80 and the counter plane 84 are substantially parallel to each other. However, the shape of the light guide plate of the present invention is not limited to this. In the present preferred embodiment, descriptions are given of a light guide plate preferably having a wedge shape. FIG. 6 is a cross section schematically illustrating a surface light source of the present preferred embodiment. Note that, components being the same as those of first preferred embodiment are given the same reference symbols, and descriptions thereof are omitted.

A light guide plate 18 of FIG. 6 preferably has a wedge shape where the distance between the light exit plane 80 and the counter plane 84 decreases as the distance from the light entrance planes 81 and 82 increases. Since the light guide plate 18 has the wedge shape, luminance of the LEDs 6 distributes more evenly, allowing further reduction in the unevenness in luminance.

Figure 7:
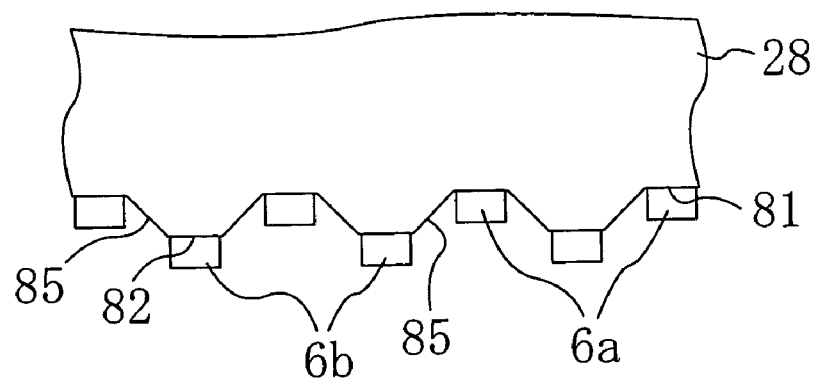
FIG. 7 is a plan view partially illustrating an end surface of a light guide plate according to a third preferred embodiment of the present invention.

In the first preferred embodiment, the end surface of the light guide plate is formed with the dovetail grooves for forming a light entrance plane. However, the shape of the light entrance plane is not limited to this. In the present preferred embodiment, a first variation of the shape of the light entrance plane will be described. FIG. 7 is a plan view partially illustrating an end surface of a light guide plate 28 of the present preferred embodiment, with the arrangement of the LEDs 6 being shown.

In the same manner as the light guide plate 8 of the first preferred embodiment, the light guide plate 28 of the present preferred embodiment includes the plurality of first end surfaces 81 and the plurality of second end surfaces 82 forming a light entrance plane. The first end surfaces 81 are connected with the second end surfaces 82 by inclined surfaces 85, each of which has an obtuse angle relative to the first and second end surfaces 81 and 82. In other words, the end surface of the light guide plate 28 according to a preferred embodiment of the present invention preferably is formed with trapezoid grooves in plan view.

In the present preferred embodiment, the mounting interval between the first LED 6*a* and the second LED 6*b* is greater than that in the first preferred embodiment. However, since the distance between the first LED 6*a* and the second LED 6*b* is greater than that in the first preferred embodiment, it is possible to further reduce the interference between the LEDs 6 due to heat generation. Moreover, since an opening of each groove is greater than a bottom surface (first end surface 81) of the groove, heat generated from the first LED 6*a* hardly remains in the groove. Therefore, a reduction in light emitting efficiency due to an increasing temperature of the first LED 6*a* itself is suppressed, so that the restriction on the maximum current applied to the first LED 6*a* is eased.

Figure 8:
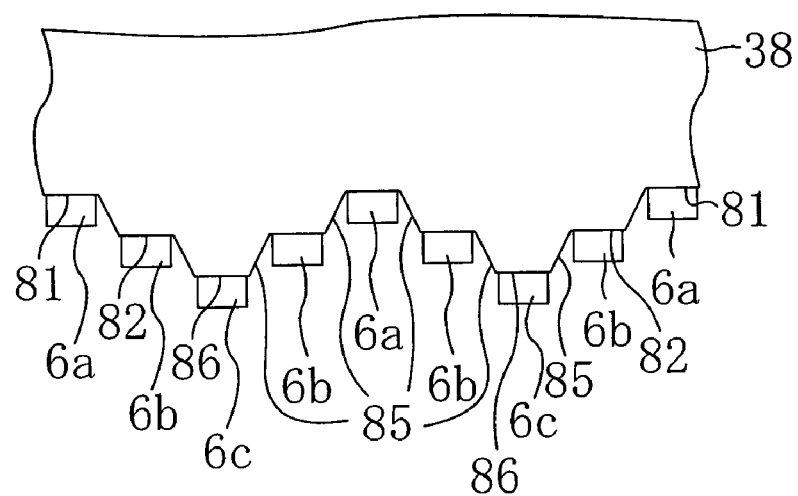
FIG. 8 is a plan view partially illustrating an end surface of a light guide plate according to a fourth preferred embodiment of the present invention.

In the present preferred embodiment, descriptions are given of a second variation of the shape of a light entrance plane. FIG. 8 is a plan view partially illustrating an end surface of a light guide plate 38 of the present preferred embodiment, with the arrangement of the LEDs 6 being shown.

The light entrance plane of the present preferred embodiment has the plurality of first end surfaces 81, the plurality of second end surfaces 82, and a plurality of third end surfaces 86. In plan view, the second end surfaces 82 protrude in an external direction beyond the first end surfaces 81, and the third end surfaces 86 protrude in an external direction beyond the second end surfaces 82. The first end surfaces 81, the second end surfaces 82, and the third end surfaces 86 are arranged along the periphery of the light exit plane such that ascending and descending orders are repeated. The inclined surfaces 85 connecting the first end surfaces 81 with the second end surfaces 82 and the second end surfaces 82 with the third end surfaces 86 have an obtuse angle respectively to the end surfaces 81, 82, and 86 connected to the inclined surfaces 85. The end surfaces 81, 82, and 86 are substantially parallel to one another, and the optical axes of LEDs 6*a*, 6*b*, and 6*c* respectively arranged on end surfaces 81, 82, and 86 are also substantially parallel to one another.

In the present preferred embodiment, the light guide plate 8 has an end surface provided with three lines of LEDs 6. Specifically, a line of the first LEDs 6*a*, a line of the second LEDs 6*b*, and a line of the third LEDs 6*c* are arranged on the periphery of the light exit plane 80. In plan view, the line of the second LEDs 6*b* protrudes in an external direction beyond the line of the first LEDs 6*a*, and the line of the third LEDs 6*c* protrudes in an external direction beyond the line of the second LEDs 6b. Although the plurality of third end surfaces 86 are provided in the present preferred embodiment, the number of third end surfaces 86 may be one.

A surface light source according to a preferred embodiment of the present invention includes a plurality of light sources which are arranged out of alignment with a straight line (one line) along the periphery of the light exit plane and are arranged in a plurality of lines in plan view as shown in the first preferred embodiment and in the present preferred embodiment. Moreover, the light sources being adjacent to each other in the periphery direction of the light exit plane belong to different lines. In other words, the plurality of light sources are arranged in a wave form along the periphery of the light exit plane. Therefore, according to the surface light source of various preferred embodiments of the present invention, it is possible to reduce the mounting interval between the light sources and to ensure a sufficient distance between the light sources adjacent to each other.

Although the preferred embodiments of the present invention have been described, the technical scope of the present invention is not limited to that described in the above preferred embodiments. It should be understood by those skilled in the art that the above preferred embodiments are exemplary only, and that various modifications may be further made to combinations of the foregoing components and processes and such modifications are also intended to fall within the technical scope of the present invention.

For example, in the above preferred embodiments, a light guide plate preferably having one light exit plane has been described. However, the light guide plate may have light exit planes on both surfaces. In other words, the light guide plate may be for lighting devices of double-sidelight emitting type. Such a light guide plate for lighting devices of double-sidelight emitting type is disclosed, for example, in Japanese Laid-Open Patent Publication Nos. 7-120623, 2001-67049, 2002-132189, and 2003-177406.

In the above preferred embodiments, descriptions have been given of a light guide plate having four end surfaces, one of which forms a light entrance plane. However, the present invention is not limited to this. For example, two of the four end surfaces facing each other of the light guide plate may form light entrance planes, or all four end surfaces of the light guide plate may form light entrance planes. In other words, at least one of four end surfaces of the light guide plate forms a light entrance plane. In the case where two end surfaces facing each other form light entrance planes, the optical axis of a light source arranged on one end surface may overlap with or slightly overlap with the optical axis of a light source arranged on the other end surface.

The present invention is applicable, for example, to a light guide plate for a light source of sidelight type, a surface light source including the light guide plate, and a liquid crystal display device including the surface light source.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A surface light source comprising:
   a light guide plate including:
   a light exit plane; and
   a light entrance plane arranged on a periphery of the light exit plane; wherein
   the light exit plane and the light entrance plane are arranged to allow light incident on the light entrance plane to exit the light exit plane;
   the light entrance plane includes a plurality of end surfaces including at least one first end surface and at least one second end surface protruding in an external direction beyond the at least one first end surface in plan view of the light exit plane; and
   the at least one first end surface and the at least one second end surface are alternately arranged along the periphery of the light exit plane; and
   a plurality of light sources arranged to emit light onto the plurality of end surfaces; wherein
   the plurality of light sources are arranged out of alignment with a straight line along the periphery of the light exit plane; and
   the at least one first end surface and the at least one second end surface of the plurality of end surfaces are parallel or substantially parallel to each other.

2. The surface light source of claim 1, wherein each of the light sources is an LED of at least one color selected from the group consisting of a white LED, a red LED, a green LED and a blue LED.

3. A liquid crystal display device comprising:
   the surface light source of claim 2; and
   a liquid crystal display panel arranged on a light exit plane side of the surface light source.

* * * * *